JUNCTION TRANSISTOR PULSE GENERATOR

Filed Oct. 30, 1959

INVENTOR
P. S. FUSS
BY [signature]
ATTORNEY

United States Patent Office 3,069,563

Patented Dec. 18, 1962

3,069,563
JUNCTION TRANSISTOR PULSE GENERATOR

Peter S. Fuss, Summit, N.J., assignor to Bell Telephone Laboratories, Incorporated, New York, N.Y., a corporation of New York Filed Oct. 30, 1959, Ser. No. 849,981
10 Claims. (Cl. 307—88.5)

This invention relates to pulse generators and, in particular, to pulse generators for driving ultrasonic delay lines.

In pulse operated apparatus, it is sometimes necessary to determine whether or not the intervals between time-spaced pulses are substantially equal to a predetermined interval. One technique utilized in the prior art for making such a determination delays each of the pulses for the predetermined interval and then produces an output signal only when a pulse which has been delayed occurs substantially simultaneously with its succeeding pulse before it is delayed. This technique, however, depends on the ability to delay the pulses the desired amount.

A pulse delaying arrangement which may be utilized in practicing the above-described technique is the ultrasonic delay line. An ultrasonic delay line consists primarily of two piezoelectric transducers between which is placed a material that propagates ultrasonic vibrations. These vibrations are produced by the transducer at the input end of the line in response to a signal from a driving source. The transducer at the output end of the line produces an output signal in response to the vibrations. The driving source, in addition to producing a driving signal, must also be capable of driving a relatively low impedance load (such as, for example, 10 to 50 ohms) as the transducers are generally very low Q parallel circuits tuned at the frequency of the vibrations in order to operate more effectively.

As far as applicant is aware, the known sources for driving ultrasonic delay lines are of two basic types. One of these types includes a free running oscillator the output of which is gated by the pulses to be delayed, while the other includes a normally biased-off oscillator which is turned on by the pulses to be delayed. The signals produced by these sources are therefore bursts of sinusoidal waveforms. These oscillators, however, must be operated at substantially the center frequency of the tuned delay line or large attenuation and pulse envelope distortions result. Because an oscillator is generally critical to temperature, component and aging variations (especially when transistors are used), it is difficult to maintain its frequency constant.

An object of the present invention is to make the operation of the driving source of an untrasonic delay line less dependent on the center frequency of the line.

In accordance with the present invention, a pulse, instead of a burst of sinusoidal waves, is used as the input signal to an ultrasonic delay line. This pulse shock excites the tuned transducer at the input end of the line so that a decaying group of sinusoidal waves at substantially the center frequency of the line is produced. In order to efficiently shock excite the transducer, the duration of the pulse should be substantially equal to one half of the period of the center frequency of the line. A pulse having a duration of approximately 33 millimicroseconds, for example, is necessary to efficiently shock excite a line having a center frequency of approximately 15 megacycles.

Although low output impedance sources for producing pulses are found in the prior art, these sources are not only complex, but some of their components are both expensive and difficult to construct. This is especially true when substantially constant duration pulses having durations of less than 50 millimicroseconds are desired. It has also been found difficult to get the desired power output from these prior art sources without the use of additional equipment. Furthermore, in order to provide a maximum amplitude and duration of the decaying group of waves in the line, the source should have a relatively high output impedance for a period of time after the line has been shock excited so that the oscillations are not seriously damped.

Another object of the invention is to produce pulses having substantially constant durations that may be less than 40 millimicroseconds and capable of driving an ultrasonic delay line from a relatively simple source which has a relatively low output impedance while producing an output pulse and a relatively high output impedance after producing the pulse.

The present invention accomplishes the last mentioned object by taking advantage of certain characteristics of a junction transistor which have often been considered undesirable in prior art pulse circuitry. In particular, when a junction transistor is permitted to become saturated (that is, when the carriers in the base region exceed those necessary for the collector current), a finite length of time is required to remove the stored carriers after the driving current is removed. Because the time necessary to remove the stored carriers limits the minimum length of the pulses that can be obtained from the collector circuit of the transistor, various techniques have been used to prevent saturation. The present invention, contrary to the prior art known to applicant, produces relatively short duration pulses in the base circuit of a junction transistor by rapidly driving the transistor into saturation.

In one of its broader aspects, the invention takes the form of a normally nonconducting junction transistor having a load connected in its base circuit and circuitry for applying to the transistor a driving current pulse which reaches a maximum at substantially when the collector-to-base junction of the transistor becomes saturated. During substantially all of the time the driving current pulse is applied to the transistor, a current of a first polarity flows in the base circuit. As the driving current pulse decreases, the base current decreases and, in accordance with a feature of the invention, reverses in direction as a result of both the removal of the driving current pulse and the clearing of carrier storage through the collector-to-base junction. When the load comprises a tuned circuit (such as an ultrasonic delay line) having a resonant frequency with a period equal to four times the time necessary to saturate the transistor, the tuned circuit is efficiently shock excited by the base current which appears as a current flow of a first polarity and then a current flow of the opposite polarity. In accordance with another feature of the invention, the base of the transistor appears as a relatively high impedance during the clearing of the carrier storage from the collector-to-base junction. When the load comprises a tuned circuit, this feature reduces the damping of the oscillations in the line.

In one embodiment of the invention the circuitry for applying to the transistor a driving current pulse which reaches a maximum at substantially when the transistor saturates comprises a regenerative feedback path somewhat similar to those found in blocking oscillator circuits. This feedback path senses when the transistor is being driven towards saturation and couples a signal back to the emitter which maintains an increasing driving current until saturation is reached. Included in the feedback path is a serially connected capacitor. Whereas, as far as applicant is aware, similar capacitors in blocking oscillator circuits are chosen to either control the turn-off time of the oscillators or block direct current flow, another feature of the present invention is that the value of the capacitor is chosen to provide a sufficient feedback driving current while becoming substantially fully charged when the collector-to-base current reaches a maximum. This feature of the invention maximizes the peak amplitude of the base current pulse, which maximizes the power delivered to the load.

A further difficulty frequently arises when using delay line driving sources to make the previously described pulse interval determinations. In particular, there is generally a delay between the time that a pulse is applied to a driving source and the time that an output is produced. Furthermore, this delay or turn-on time generally varies with variations in the waveform and amplitude of the input pulse as well as with variations in circuit components. Because this delay is part of the overall delay to which a pulse is subjected, it cannot vary to the extent that it negates the overall tolerance of the circuitry. One technique that has been used to substantially eliminate the effect of variations in turn-on time produced by variations in the waveform and amplitude of the input pulse takes advantage of the fact that although tne waveforms and amplitudes of the individual pulses of a series of supposedly identical pulses may change over a period of time, the variations on a pulse-to-pulse basis are generally of an undetectable level. In particular, this technique uses the turn-on time required for a pulse to substantially cancel the turn-on time required for the immediately preceding pulse by not only using the source output to drive the delay line but to also use it as the signals with which the delay line output is to be compared. A compensating effect is thus produced so that the only turn-on time that appears in the overall delay is the before-mentioned undetectable amount introduced by the slight variations of the pulse waveforms and amplitudes that occur on a pulse-to-pulse basis. Furthermore, by using the source output to both drive the delay line and as the signals with which the delay line output is to be compared, variations produced by variations in the source components are also substantially eliminated. Although this technique is highly effective, it has been found that additional circuitry is necessary for isolation, impedance matching and wave shaping purposes.

A further object of the invention is to provide the above-described compensating effect without the necessity of providing additional circuitry for isolation, impedance matching and wave shaping purposes.

In accordance with the present invention, the last-mentioned object is achieved by obtaining a second pulse output from the collector circuit of the transistor. This second pulse output has the desired waveform and is obtained from a portion of the circuit which is isolated from the first pulse output portion of the circuit and which has the desired output impedance.

Other objects and features of the invention will become apparent from a study of the following detailed description of a specific embodiment.

Figures 1, 2A, 2B, 2C, 3:
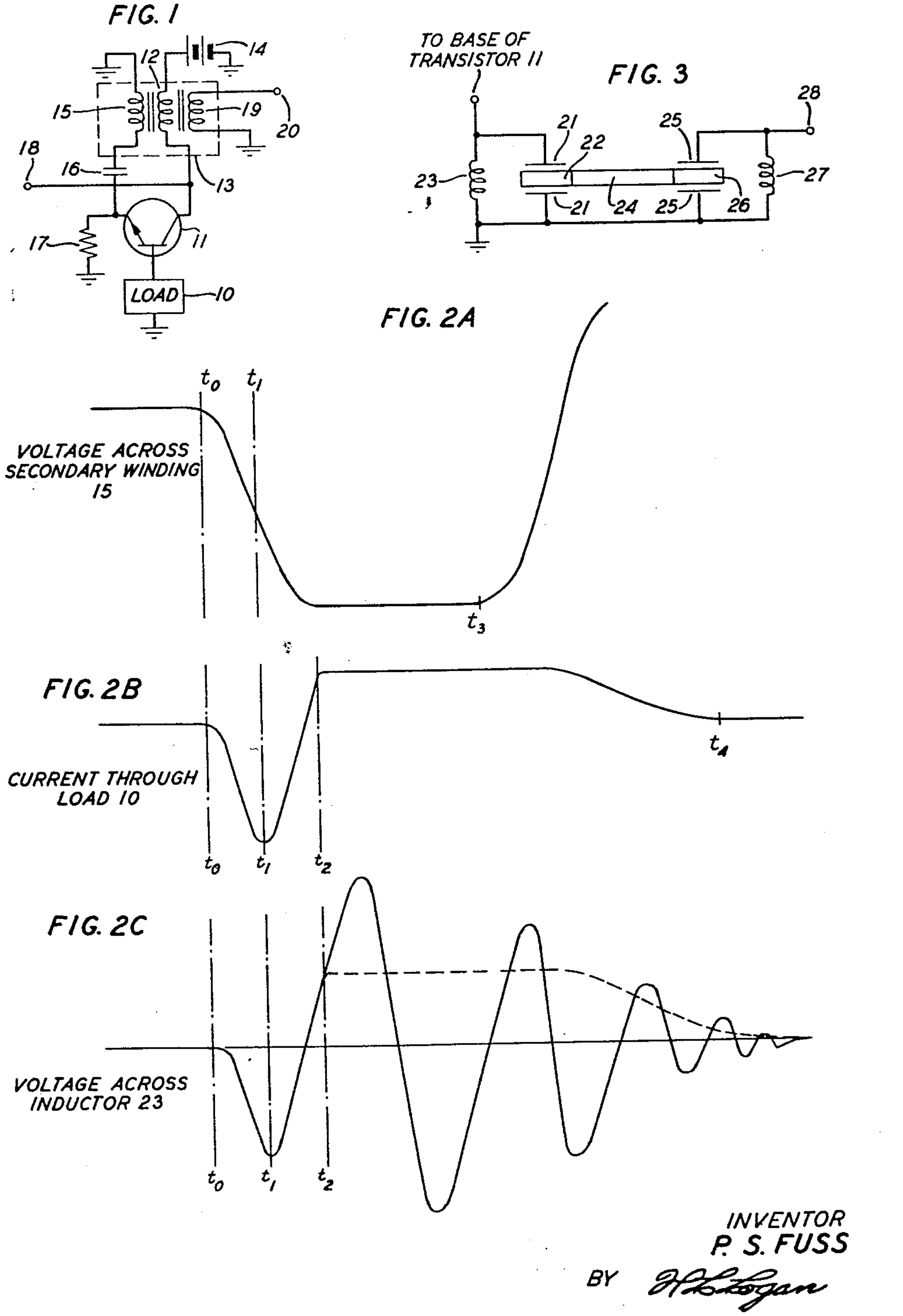
FIG. 1 shows a schematic diagram of one embodiment of the invention.
FIG. 2A through 2C illustrate waveforms of voltages and currents.
FIG. 3 shows a schematic diagram of an ultrasonic delay line that may be used as the load in the embodiment of FIG. 1.

In FIG. 1 a load 10 is connected between a point of ground potential and the base electrode of an NPN junction transistor 11. The collector electrode of transistor 11 is connected through a primary winding 12 of a transformer 13 to a positive potential terminal of a potential source 14. The negative potential terminal of source 14 is connected to a point of ground potential. One extremity of a secondary winding 15 of transformer 13 is connected to a point of ground potential while its other extremity is connected by way of a capacitor 16 to the emitter electrode of transistor 11. Transformer 13 and capacitor 16 co-operate to form a regenerative feedback path. A resistor 17 is connected between the emitter electrode of transistor 11 and a point of ground potential, while a trigger input terminal 18 is connected to the collector electrode of the transistor. A secondary winding 19 of transformer 13 is connected between an auxiliary output terminal 20 and a point of ground potential.

Although it has been ascertained that the embodiment of FIG. 1 accomplishes the above objects, its mode of operation is not easily ascertainable because of the rapid and nonlinear manner in which it operates. The embodiment is believed, however, to operate as follows. When a negative trigger pulse is applied to trigger input terminal 18, a current is caused to flow from the positive potential terminal of source 14 through primary winding 12 to trigger input terminal 18. Primary winding 12 and secondary winding 15 are poled so that the increasing current flow from source 14 to terminal 18 induces a voltage across secondary winding 15 to apply a negative potential to the terminal of capacitor 16 which is connected to this winding. The waveform of the voltage appearing across secondary winding 15 is shown in FIG. 2A. As capacitor 16 cannot instantaneously assume a charge, this same negative potential is applied to the emitter electrode of transistor 11 which forward biases its emitter-to-base junction. A current then flows from ground through load 10 (which, for the present, is assumed to be resistive to simplify the explanation) and the base-to-emitter path of transistor 11. The waveform of the current through load 10 is shown in FIG. 2B. At substantially the same time, a second current begins to flow from source 14 through primary winding 12 and the collector-to-emitter path of transistor 11. This second current flow through primary winding 12 induces a voltage in secondary winding 15 which is in a direction to further increase the negative potential applied to capacitor 16; that is, it is applied in a regenerative manner. This increasing negative potential and the resulting increasing current causes a sufficient number of carriers to be injected into the collector-to-base junction to cause it to saturate. In the drawings, the trigger pulse is applied at a time $t_0$ while saturation of the collector-to-base junction occurs at approximately time $t_1$. The voltage and current changes between times $t_0$ and $t_1$ are produced primarily as a result of the increasing collector-to-emitter current. When the collector-to-base junction becomes saturated at approximately time $t_1$, a collector-to-base current greater than that flowing during cut-off begins to flow. This collector-to-base current flows in a direction opposite to that of the load current between times $t_0$ and $t_1$ and therefore causes the load current to diminish. The load current is further diminished by a decrease in the base-to-emitter current. The decrease in the base-to-emitter current is attributed to two factors. Firstly, the rate of change of the voltage across winding 15 is decreasing which tends to reduce the base-to-emitter current flow necessary to charge capacitor 16. Furthermore, in accordance with one feature of the invention, capacitor 16 is chosen so that its charging current from times $t_0$ to $t_1$ is sufficient to rapidly drive the transistor into saturation while the capacitor becomes substantially charged by time $t_2$ so that the base-to-emitter current becomes substantially zero. At time $t_2$, therefore, the load current is a maximum in a polarity sense opposite to the load current at time $t_1$. This maximizes the power injected into the load. Sometimes between times $t_1$ and $t_2$ and after time $t_2$, the base electrode appears as a relatively high impedance to load 10. The collector-to-base current continues to flow until time $t_4$ as a result of the previously stored carriers. The voltage across secondary winding 15 remains at a substantially constant negative value from time $t_2$ to a time $t_3$ as a result of energy stored in transistor 11 and the inductance of transformer 13. At time $t_3$, the gain of the feedback loop is less than unity and the circuit turns off in a regenerative manner.

Another feature of the present invention is that a second output synchronized with the pulse output delivered to load 10 is obtainable from across secondary winding 19. This output is especially useful when it is desired to determine whether or not the interval between two time-spaced pulses is substantially equal to a predetermined interval. When used to make such a determination, load 10 comprises an ultrasonic delay line the output of which is applied to one input of a normally disabled gate circuit while the output at terminal 20 is applied to the remaining input of the gate circuit. When the trigger pulses are correctly time-spaced, a delay time output produced by a base circuit pulse which, in turn, was produced by a trigger pulse arrives at the gate circuit at substantially the same time the output from winding 19, produced by the succeeding trigger pulse, arrives at the gate. This feature of the invention is more fully discussed in the introductory portion of the present specification.

FIG. 3 is a schematic diagram of an ultrasonic delay line that may be connected in the base circuit of transistor 10. The input end of the line comprises a transducer formed by a pair of plates 21, piezoelectric material 22 and an inductor 23 connected in parallel with plates 21. Inductor 23 and plates 21 in co-operation with material 22 form a parallel tuned circuit. When this line comprises load 10 of FIG. 1, one terminal of inductor 23 is connected to the base electrode of transistor 10 while the other terminal is connected to ground. When connected in this manner and a trigger pulse is applied, the current pulse between times $t_0$ and $t_2$ of FIG. 2B efficiently shock excites the tuned circuit formed by inductor 23, plates 21 and material 22. The decaying oscillations that occur in the tuned circuit are shown in FIG. 2C. Superimposed (by way of a broken line) in FIG. 2C is the voltage waveform obtained when load 10 is resistive in nature as previously considered. It should be noted that the positive excursions of the oscillations exceed the resistive load voltage waveform due to the energy stored in the tuned circuit. Damping of the oscillations is increased significantly when the positive excursions of the oscillations exceed the resistive voltage waveform. The previously discussed phenomenon in the circuit that causes the resistive voltage waveform to decay also causes the oscillations to decay thereby producing a controlled pulse burst.

Material 22 of FIG. 3 is bonded to a material 24 which relatively slowly propagates ultrasonic vibration with small losses. The transducer produces ultrasonic vibrations in material 24 which are similar in waveform to the waveform of FIG. 2C. At the other end of material 24 is a second transducer comprising a tuned circuit formed by an inductor 27, a pair of plates 25 and material 26 which is identical to the input transducer. This second transducer converts the mechanical vibrations transmitted by material 24 into an electrical output having a waveform similar to FIG. 2C and which is available at an output terminal 28.

Although only one embodiment of the invention has been described in detail, it is to be understood that various other embodiments may be devised by those skilled in the art without departing from the spirit and scope of the invention.

What is claimed is:

1. In combination, a junction transistor having at least an emitter electrode, a base electrode and a collector electrode, impedance means connected between said base electrode and a point of reference potential, means connected between said collector electrode and said point of reference potential for reverse biasing the junction between said collector and base electrodes, and driving means connected to said emitter electrode to apply a driving current to said emitter electrode for driving the collector-to-base junction of said transistor into saturation and to decrease said driving current after said saturation so that said driving current is substantially zero when the collector-to-base current produced as a result of said saturation reaches a maximum rate of flow.

2. Apparatus in accordance with claim 1 wherein said impedance means comprises a parallel tuned transducer for converting electrical signals into ultrasonic vibrations.

3. Apparatus in accordance with claim 1 wherein said driving means comprises a regenerative feedback path connected between said collector and emitter electrodes.

4. Apparatus in accordance with claim 3 wherein said feedback path includes a serially connected capacitor having a value of capacitance so that current flowing through said feedback path causes said capacitor to be substantially fully charged when said collector-to-base current reaches a maximum rate of flow.

5. Apparatus in accordance with claim 4 wherein said impedance means comprises a parallel tuned transducer for converting electrical signals into ultrasonic vibrations.

6. In combination, a junction transistor having at least an emitter electrode, a base electrode and a collector electrode, impedance means connected between said base electrode and a point of reference potential, a direct current path connected between said emitter electrode and said point of reference potential, a transformer having at least one primary winding and one secondary winding, first means connecting one terminal of said primary winding to said collector electrode, second means connected between the remaining terminal of said primary winding and said point of reference potential for reverse biasing the junction between said collector and said base electrodes, third means connecting one terminal of said secondary winding to said point of reference potential, a capacitor, and fourth means connecting said capacitor between said emitter electrode and the remaiing terminal of said secondary winding, said windings being poled and having a turns-ratio to form with said capacitor a regenerative feedback path that drives the collector-to-base junction of said transistor into saturation and said capacitor having a capacitance value so that said capacitor is substantially fully charged when the collector-to-base current that flows as a result of said saturation reaches a maximum rate of flow.

7. Apparatus in accordance with claim 6 wherein said impedance means comprises a parallel tuned transducer for converting electrical signals into ultrasonic vibrations.

8. Apparatus in accordance with claim 6 wherein said direct current path comprises a resistor.

9. Apparatus in accordance with claim 6 wherein said transformer includes a second secondary winding.

10. Apparatus in accordance with claim 9 wherein said impedance means comprises a parallel tuned transducer for converting electrical signals into ultrasonic vibrations.

References Cited in the file of this patent

UNITED STATES PATENTS 2,999,171 Ketchum --------------- Sept. 5, 1961